United States Patent [19]
Osgood et al.

[11] Patent Number: 5,201,335
[45] Date of Patent: Apr. 13, 1993

[54] METHOD AND APPARATUS FOR ATTACHING CERAMIC TO METAL PARTS

[75] Inventors: Melvin L. Osgood; Rodney P. Western, both of Marshalltown, Iowa

[73] Assignee: Fisher Controls International, Inc., Clayton, Mo.

[21] Appl. No.: 776,578

[22] Filed: Oct. 15, 1991

[51] Int. Cl.⁵ ...................... F16L 55/18; F16K 51/00
[52] U.S. Cl. ..................................... 137/15; 137/315; 251/356; 403/30
[58] Field of Search ......... 251/368, 319, 356; 137/15, 315; 403/30

[56] References Cited

U.S. PATENT DOCUMENTS

| | | | |
|---|---|---|---|
| 3,281,904 | 11/1966 | Murton | 251/367 |
| 3,352,533 | 11/1967 | Murton | 251/356 |
| 3,352,534 | 11/1967 | Harley | 251/356 |
| 4,575,047 | 3/1986 | Boos et al. | 251/356 |

FOREIGN PATENT DOCUMENTS 1579249  7/1969  France ................................. 251/356

*Primary Examiner*—A. Michael Chambers
*Attorney, Agent, or Firm*—Marshall, O'Toole, Gerstein, Murray & Bicknell

[57] ABSTRACT

A metal valve stem is attached to a ceramic valve plug. An elongated metal screw member has an expandable section securely wedged into a cavity in the plug as the attached screw/ceramic plug are threadably tightened on the valve stem. A first pre-wedging step presses an expander on the screw to fully bend the expander inside the ceramic cavity. The second wedging step during tightening of the screw/plug on the stem ensures uniform loading of the expander on the ceramic cavity surfaces.

12 Claims, 1 Drawing Sheet

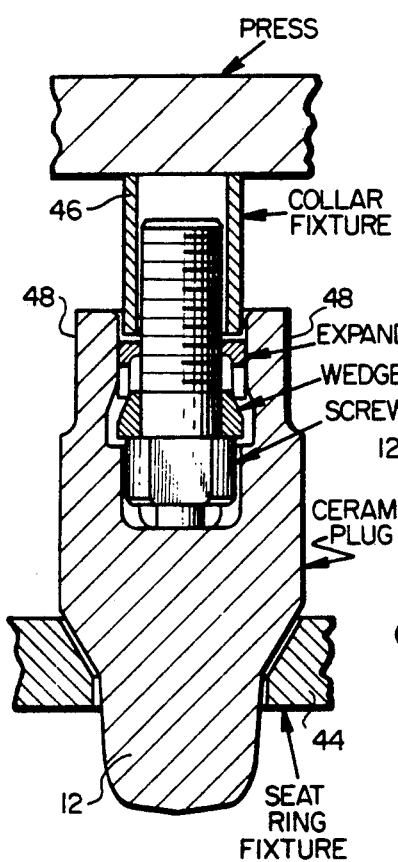
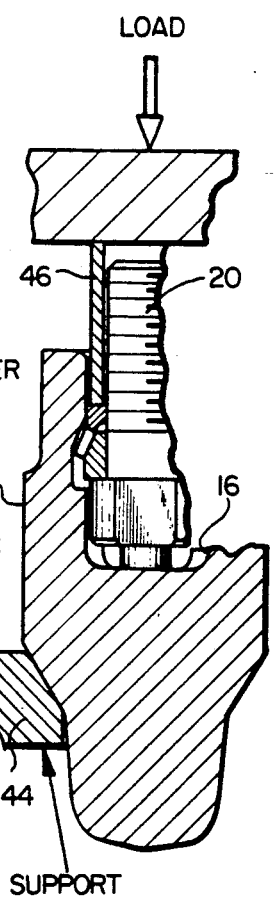
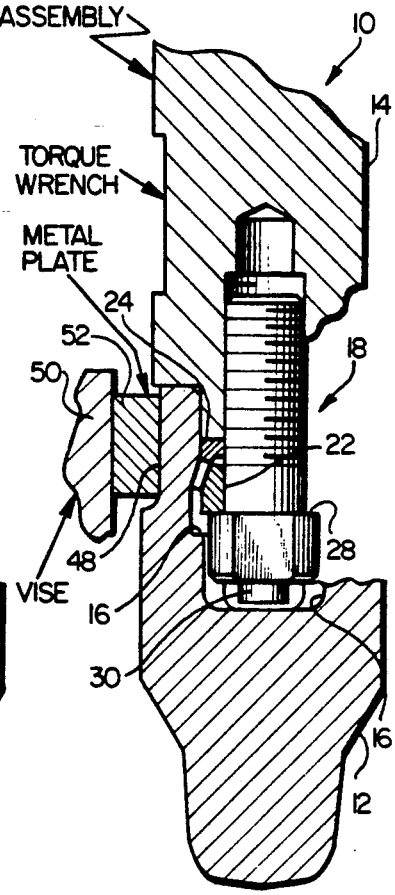
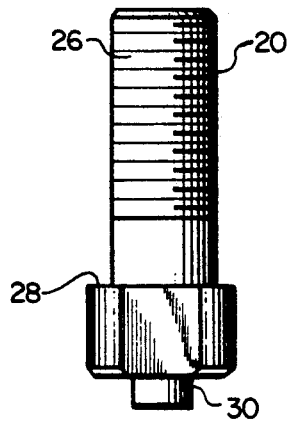
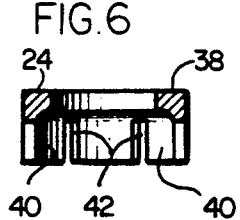
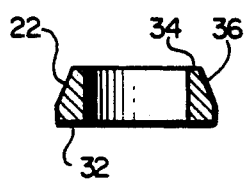
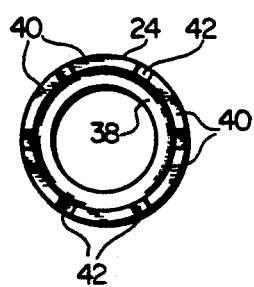

METHOD AND APPARATUS FOR ATTACHING CERAMIC TO METAL PARTS

This invention relates to methods and apparatus for attaching two parts together, and in particular to the attachment of a valve plug to a valve stem in a fluid valve assembly.

BACKGROUND OF THE INVENTION

In fluid valve assemblies, a rotating or sliding operating member, such as a valve stem normally includes a valve plug on the end thereof for engagement with the valve seat in controlling the flow of fluid through the valve. During assembly, a metal valve plug formed with a threadable member is threadably engaged with the valve stem until the plug is securely threadably tightened onto the stem.

In certain situations, it is desired to utilize non-metal material, such as ceramic for the valve plug. First of all, it is very difficult and expensive to incorporate threads on ceramic material, either on the exterior or interior of a ceramic valve plug. Secondly, even when this is accomplished, the normal type of threadable attachment of a valve plug with a valve stem often leads to cracks in the ceramic plug due to the differences in material characteristics and properties between the ceramic plug and the threadably engaged metal stem.

Accordingly, it is desired to provide apparatus and a method for reliably attaching a non-metal part, such as a ceramic plug to a metal valve stem in a reliable, easy, and inexpensive manner.

SUMMARY OF THE INVENTION

A non-metal valve plug member is formed with a cavity, and a bendable metal expander member is placed around a threaded screw member and securely wedged into the cavity during threadable engagement of the screw member onto the valve stem so as to form a tight connection between the non-metallic valve plug and the metal valve stem.

In accordance with the principles of the invention and in the preferred embodiment thereof, a ceramic valve plug is formed with an interior cavity at one end. An elongated metal screw member includes a wedge ring portion at one end and an opposite threaded end. The metal screw member is inserted into the ceramic cavity with its threaded screw end extending out from the cavity. A bendable metal expander member in the form of a multiply split ring is placed into the ceramic cavity adjacent the screw member wedge ring portion.

In the preferred embodiment of the invention, the expander is pressed into the wedge so that the multiple split sections of the expander are fully bent around the wedge and with these bent portions of the expander now wedged into the ceramic cavity to maintain the screw member within the ceramic plug. This completes the first step or pre-wedging operation.

In the next step or final wedging operation, the screw threaded end is threadably engaged with the valve stem and tightened in position to ensure that there is uniform loading of the expander/wedge combination on the ceramic cavity surfaces. It is desired that the fully bent, multiple split sections of the expander are urged into firm, uniform contact engagement with the adjacent ceramic surfaces completely around the cavity. This aids in preventing undesired stress point contacts between the expander and the ceramic which could lead to ceramic cracks and eventual breakage.

It has been found that threadably tightening the screw member onto the valve stem without using the pre-wedging step occasionally yields satisfactory results. However, without using the pre-wedging step to ensure that the expander is fully bent, there is the possibility that the metal parts will gall together without the expander being fully bent, which could thereby place potentially high (breaking) stresses into the ceramic. Also, if the expander is not fully bent, a reliably tight attachment may not be achieved and the valve plug-stem assembly may loosen or pull apart in service. Accordingly, the use of the additional pre-wedging step is preferred.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 1 is a sectional elevational view illustrating an expandable metal screw member portion for wedging in a ceramic plug cavity;

FIG. 2 is a partly sectional elevational view illustrating a pre-wedging step for bending the expandable metal section until it is fully bent;

FIG. 3 is a partly sectional elevational view illustrating the ceramic valve plug threadably engaged onto a threaded valve stem for final wedging;

FIG. 4 is an elevational view of an elongated screw member which is wedged into the ceramic plug cavity;

FIG. 5 is a sectional view of a wedge member mountable on the screw of FIG. 4;

FIG. 6 is a sectional view illustrating a metal expansion member wedged into the ceramic cavity in the steps of FIGS. 2 and 3; and FIG. 7 is a bottom plan view of the expansion member of FIG. 6.

DETAILED DESCRIPTION

The principles of the present invention will be described in connection with the preferred embodiment of the invention illustrated in FIGS. 1-7 wherein a valve plug/stem assembly 10 includes a valve plug 12 formed of ceramic material which is attached to a radially operated or longitudinally operated valve member, such as a metal valve stem 14. The drawings illustrate a preferred technique for attaining a reliable, inexpensive and readily constructed attachment of ceramic valve plug 12 onto metal stem 14.

Ceramic plug 12 includes a cavity 16 for receiving a wedging screw assembly 18 which forms the means for attachment of the ceramic plug onto the valve stem.

Wedging screw assembly 18 includes an elongated screw member 20, a wedge ring 22, and an expander ring 24 each of which components is most clearly identified in FIGS. 4-7. Screw member 20 includes a threaded section 26 at one end and a shoulder 28 at the other end formed integral with the screw and having a slightly larger diameter than the threaded end. Base 30 extends from one end of the screw as shown in FIG. 4.

Wedge ring 22 includes a lower face 32 and an upper face 34 with an angled wedging surface 36 therebetween. The inner ring diameter is sized so that wedge ring 22 can be inserted over threaded section 26 until lower face 32 rests on shoulder 28.

Expander ring 24 is in the form of a split ring having a base portion 38 from which there extends several split leg sections 40 each of which is separated by a small space 42. As shown in FIG. 1, the expander ring inner diameter is sized so as to be inserted over threaded section 26 with split legs 40 resting on angled surface section 36 of the wedge ring. It is understood of course that the screw 20, wedge ring 22 and expander ring 24 components of the wedging screw assembly 18 are all formed of metal.

In accordance with the present invention, wedging screw assembly 18 is securely wedged within cavity 16 as threaded screw section 26 engages the threaded section of stem 14. FIGS. 1 and 2 illustrate the preferred embodiment of the invention wherein the screw assembly is initially pre-wedged into the cavity so as to fully bend expander ring split legs 40 before the final wedging operation is attained in a second step of tightening the plug/screw combination onto metal stem 14 as shown in FIG. 3.

Initially, the wedging screw assembly is put together with wedge ring 22 assembled onto shoulder 28 and expander ring 24 resting on the wedge ring. Next, the wedging screw assembly 18 is inserted into cavity 16 until base 30 rests on the cavity floor and so that threaded section 26 extends beyond the upper end of cavity 12. Screw base 30 and the bottom of cavity 16 are formed with matching locking surfaces so that screw 20 and plug 12 rotate together The screw assembly 18 and plug 12 are then inserted into a fixture such as illustrated in FIG. 1. In particular, plug 12 is inserted into a seat ring fixture 44 and screw 20 is inserted into a collar fixture 46 with the collar fixture extensions in contact with base 38 of expander ring 24.

A pre-wedging operation is now initiated wherein a load is applied to the collar fixture while the seat ring fixture is supported in position. This operation forces expander ring 24 onto wedge ring 22 to fully bend split legs 40 outwardly along angled surface 36. As shown in FIG. 2, sufficient loading is supplied to the collar fixture so as to ensure that split legs 40 are fully bent around wedge ring 22.

It has been found that with a constructed prototype of the invention incorporating a ceramic valve plug and stainless steel alloy S17400 Double H1150 for the mating metal parts (screw, expander, wedge) a load of about 1500 pounds is required to fully bend the expander legs during the pre-wedging operation.

Next, threaded section 26 is threadably engaged onto stem 14 and the screw is tightened to ensure there is a uniform contact engagement of the split legs 40 with the opposite ceramic surfaces within cavity 16. In this connection, it has been found most desirable to provide opposite flat surfaces 48 on the exterior of ceramic plug 12 so that the ceramic plug can be held in a vice 50 with metal plates 52. Stem 14 may then be tightened by using a torque wrench on stem 14 until the desired uniform contact of split legs 40 with the opposite ceramic surfaces in cavity 16 is achieved.

In the same constructed prototype of the invention described above, it has been found that the screw should be torqued to about 8-9 foot-pounds to achieve the desired uniform loading of this final wedging step and to provide a preloading of the plug/stem assembly greater than the expected applied load experienced in service due to pressure unbalance forces tending to loosen the plug/stem assembly. If desired, one may drill and pin the ceramic plug assembly to the metal stem as in a standard plug/stem assembly.

The foregoing detailed description has been given for clearness of understanding only, and no unnecessary limitations should be understood therefrom, as modifications will be obvious to those skilled in the art.

We claim:

1. A method of attaching a valve plug to a threaded valve stem where the plug and stem are formed of dissimilar materials, comprising the steps of:

providing a cavity at one end of the valve plug;

providing an elongated screw member with a threaded section at one end and an expandable section at the other end;

inserting the screw member expandable section into the valve plug cavity with the threaded section extending beyond the cavity;

pre-wedging the expandable section in the cavity by bending the expandable section until the expandable section is fully bent;

threadably engaging the threaded section into the threaded valve stem; and final wedging the expandable section in the cavity by threadably tightening the screw member threaded section on the valve stem to ensure substantially uniform contact between the screw member expandable section and the valve plug cavity.

2. The method of claim 1, wherein the pre-wedging step includes a pressing operation where the expandable section is pressed into the cavity.

3. The method of claim 2, wherein the pressing operation includes placing the valve plug and screw member into a fixture, and linearly pressing the expandable section into the valve plug cavity.

4. A method of attaching a ceramic valve plug to a threaded metal valve stem, comprising the steps of:

providing a ceramic cavity at one end of the ceramic valve plug;

providing an elongated metal screw member with a threaded section at one end and an expandable metal section at the other end;

inserting the screw member expandable metal section into the ceramic cavity of said ceramic valve plug with the threaded section of said screw member extending beyond the ceramic cavity;

pre-wedging the expandable metal section in the ceramic cavity by bending the metal expandable section until the expandable section is fully bent;

threadably engaging the threaded section into the threaded metal valve stem; and final wedging the expandable metal section in the ceramic cavity by threadably tightening the metal screw member threaded section on the threaded metal valve stem to ensure substantially uniform surface contact between the metal expandable section and the ceramic cavity.

5. The method of claim 4, wherein the pre-wedging step includes a pressing operation where the metal expandable section is pressed into the ceramic cavity.

6. The method of claim 5, wherein the pressing operation includes placing the ceramic valve plug and metal screw member into a fixture and linearly pressing the metal expandable section into the ceramic cavity of the ceramic valve plug.

7. Attachment apparatus for attaching a ceramic valve plug to a threaded metal valve stem, said apparatus comprising:
- a cavity at one end of the ceramic valve plug;
- an elongated metal screw member having a threaded section at one end and an expandable metal section at the other end;
- said expandable metal section in wedging engagement with said ceramic valve plug cavity and including a plurality of bendable portions being fully bent within said cavity;
- said threaded section extending beyond said cavity for threading onto said metal valve stem and enabling substantially uniform surface contact between said plurality of bendable portions and said ceramic cavity as said threaded section is tightened onto said metal valve stem.

8. Attachment apparatus according to claim 7, wherein said bendable portions include an expander ring having a base and a plurality of split legs extending from said base.

9. Attachment apparatus according to claim 8, wherein said expandable metal section includes a wedging ring for wedging said plurality of split legs within said cavity.

10. A valve plug and stem assembly comprising:
- a threaded metal valve stem;
- a ceramic valve plug having a cavity at one end;
- an elongated metal screw member having a threaded section at one end and an expandable metal section at the other end;
- said expandable metal section in wedging engagement with said ceramic valve plug cavity and including a plurality of bendable portions being fully bent within said cavity;
- said threaded section extending beyond said cavity for threading onto said metal valve stem and enabling substantially uniform surface contact between said plurality of bendable portions and said ceramic cavity as said threaded section is tightened onto said metal valve stem to form said valve plug and stem assembly having a ceramic plug.

11. A valve plug and stem assembly according to claim 10 wherein said bendable portions include an expander ring having a base and a plurality of split legs extending from said base.

12. A valve plug and stem assembly according to claim 11, wherein said expandable metal section includes a wedging ring for wedging said plurality of split legs within said cavity.

* * * * *